United States Patent [19]

Smale et al.

[11] 3,746,349
[45] July 17, 1973

[54] MECHANICAL SEALS AND/OR THRUST BEARINGS

[76] Inventors: John Reginald Smale; Francis Lambert Robson, both of P.O. Box 792, Rotorua, New Zealand

[22] Filed: Aug. 26, 1970

[21] Appl. No.: 67,195

[52] U.S. Cl.......................... 277/67, 277/68, 277/74
[51] Int. Cl........................... F16j 15/54, F16j 15/16
[58] Field of Search ................... 277/74, 96, 65, 67, 277/91, 68; 38/172

[56] References Cited
UNITED STATES PATENTS

| | | | |
|---|---|---|---|
| 3,068,014 | 12/1962 | Wilkinson | 277/74 X |
| 3,235,273 | 2/1966 | Bialkowski | 277/96 X |
| 2,863,680 | 12/1958 | Taltavall, Jr. | 277/65 X |
| 2,439,917 | 4/1948 | Anderson | 277/67 |
| 3,364,523 | 1/1968 | Schippers | 277/134 X |

*Primary Examiner*—Samuel B. Rothberg
*Attorney*—Lester Horwitz

[57] ABSTRACT

The invention relates to a mechanical seal and/or thrust bearing and comprises a thrust disc mounted on a shaft and providing a first bearing surface, and a cylinder providing an annular bearing surface mounted eccentrically about the shaft and spaced there from and held with its annular bearing surface in contact with the first bearing surface. As the shaft rotates relative rotation of the bearing surface is effected and coolant is fed between the shaft and cylinder to the surface of the thrust disc radially inwardly of the cylinder and the lubricant is fed to the surface of the thrust disc radially outwardly of the cylinder thus effecting cooling and lubrication of the mating surfaces which alter with rotation of the shaft. The shaft will rotate a rotor to rotate fluid within a closed housing, such as a pump housing, the device of the invention forming a seal between the shaft and the fluid and/or a thrust bearing for the shaft which passes from the housing.

10 Claims, 2 Drawing Figures

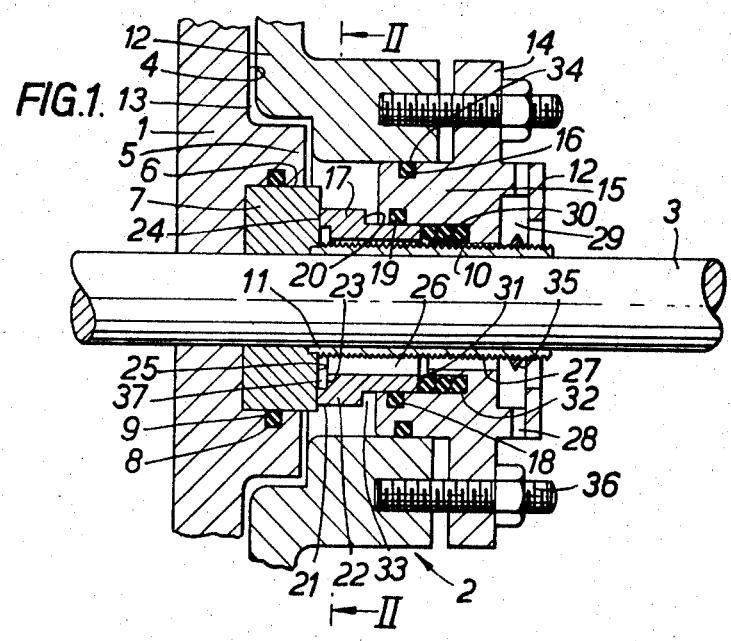
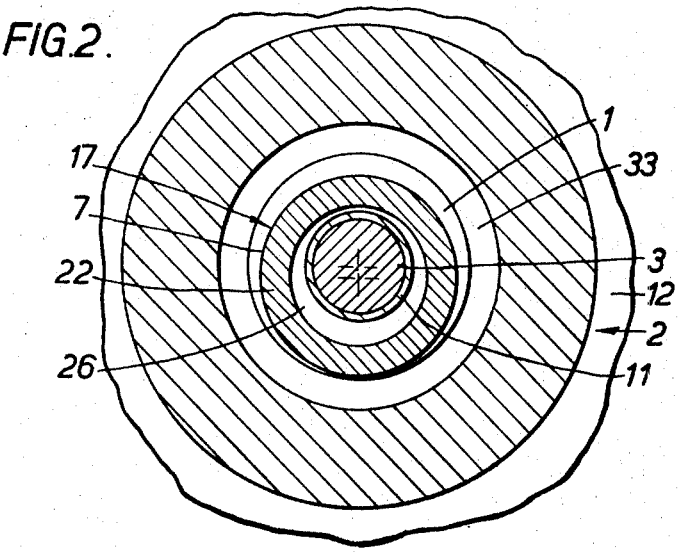

MECHANICAL SEALS AND/OR THRUST BEARINGS

The present invention relates to mechanical seals and/or thrust bearings and in particular to the lubrication and cooling thereof.

With mechanical seals it is important to ensure that the mating faces are lubricated and prevented from making actual physical contact by either the liquid being handled or by other liquid especially introduced for the purpose. A certain amount of physical contact with consequent production of frictional heat and wear can take place, particularly when handling liquids of low surface tension, and when this occurs it is necessary to have adequate provision for cooling the seal faces. The present day use of seal face materials having extremely poor thermal conductivity makes cooling even more necessary.

The mechanical seal to operate correctly, performs a similar function to thrust bearing, wherein a flow of lubricant fluid is induced to flow into the inter-face region of the bearing and so prevent direct solid contact of the face and counter-face. The problem with normal thrust bearings is the maintaining of a satisfactory flow of cool lubricating fluid between the thrust bearing faces in opposition to the pressure therebetween tending to exclude such a flow. One main way of overcoming this problem in conventional concentric thrust bearings is by the provision of radial grooves either part-way or full-way across one of the thrust bearing surfaces, but this has the disadvantage of upsetting the hydro-dynamic flow pattern in the areas of film-flow under the thrust pressure and severely limits the loads which may be carried.

Another known way of overcoming the problem is the use of tilting-pad thrust bearings, however the disadvantage of this arrangement is the relatively complicated and expensive constructions required.

It is therefore one object of the present invention to overcome these disadvantages by providing adequate cooling and lubrication of mechanical seals and/or thrust bearings whereby a relatively large portion of the contact area of the thrust bearing or sealing surfaces is progressively exposed to lubricating fluid to draw in the lubricating fluid into the inter-face area continuously by normal hydro-dynamic forces without the provision of grooves or other flow-disturbing surface irregularities. The provision of this lubrication ensures that the actual contact area is continuously lubricated by the fluid in which they are operating.

A further object of the invention is to provide a mechanical seal or thrust bearing which because of the absence of grooves, tilting areas or other flow-inducing devices, permits the use of optimum conditions of face and counter-face surface finishes.

According to the present invention a lubricating and cooling apparatus for a mechanical seal and/or thrust bearing comprises a first annular bearing surface mounted in contact with an eccentrically of a second bearing surface, the eccentricity of the bearing surface is such that the centres of the two bearing surfaces are out of line with each other by substantially half the face width of the narrower face member; one of said bearing surfaces being rotatable relative to the other bearing surface, means for enabling flow of lubricant to the thrust bearing surface outwardly of the mutually contacting portions thereof, and means enabling flow of coolant to the bearing surfaces inwardly of said mutually contacting portions of the bearing surfaces, whereby during rotation of said one bearing surface relative to the other bearing surface the lubrication and cooling of the bearing surfaces can be effected.

The fluid in which the bearing surfaces are working can act as the lubricant and air can be used as the coolant, communication being provided with the air outside the machine of which the bearing surface forms a part.

In order that the invention may be more readily understood a preferred embodiment thereof is described below by way of example only and in conjunction with the accompanying drawings, in which:

FIG. 1 is a sectional view through a thrust bearing or mechanical seal of the present invention; and, FIG. 2 is a cross-sectional view along the line A—A of FIG. 1.

In the particular embodiment shown in FIGS. 1 and 2 which can be incorporated in a machine or pump, a rotor 1 is mounted within a housing or stator 2 of a machine or pump, and liquid or gas is provided within the housing 2 whereby rotation of the rotor 1 causes pumping or radial movement of the liquid or gas from within the housing 2. The rotor 1 is mounted on a shaft 3, one face 4 namely the rear face of the rotor 1, being provided with a central circular disc-like extension 5 extending therefrom and within which extension 5 there is provided a central recess 6. A thrust disc 7 is mounted within the recess 6 extending from the recess 6 and at least one groove 8 is provided within the walls of the recess 6 within which a seal 9, such as an O-ring seal, may be accommodated to prevent flow of fluid beyond the seal 9 between the wall surface of the recess 6 and the thrust disc 7. The shaft 3 passes centrally of the thrust disc 7 and the rotor 1 to both of which it is fixed, whereby rotation of the rotor 1 and thrust disc 7 may be effected therewith. The shaft 3 is mounted within a sleeve 10 fixedly inserted at its one end 11 within the thrust disc 7 and rotatable with the shaft 3. A portion 12 of the housing or stator 2 extending to the rear of the rotor 1 has a shape substantially complementary with the rearward face 4 of the rotor 1 and spaced there from to provide a passage-way 13 between the front face 14 and rear face 4 of the rotor 1 to allow the liquid or gas in which the rotor 1 is operating to flow to contact the rearward face 4 of the rotor 1. An end plate 14 is provided for the housing 2 bolted as at 36 or otherwise fixed thereto and through which the shaft 3 and surrounding sleeve 10 extends to beyond the housing 2 of the machine or pump. The end plate 14 is provided with an inner annular extension 15 which extends within the housing 2 toward the rotor 1, the extension 15 preferably being provided with at least one groove 16 on its outer surface within which a seal 34, such as an O-ring seal may be accommodated to effect the sealing of the outer surface of the annular extension 15 and the inner surface of the housing or stator 2 with which it engages.

A hollow cylindrical bearing member 17 is provided engaged with its outer surface in contact with the inner surface of the annular extension 15 of the end plate 14, a groove 18 preferably being provided within the inner surface of the annular extension 16 having a seal 19 such as an O-ring seal, accommodated therein to effect sealing between the outer cylindrical surface of the bearing member 17 and the inner surface of the annular extension 15. The outer diameter of the cylindrical bearing member 17 is increased near the end 21 thereof remote from the end plate 14, a shoulder 20 being formed on the outer surface of the cylindrical bearing member 17 by this increased diameter portion 22. The end 21 of the cylindrical bearing member 17 has the same outer diameter but smaller inner diameter than the increased portion 22 thereof, a further shoulder 23 being formed on the inner surface therebetween to form a pocket or recess 37 which acts as a flow area for coolant to enable access right to the mating faces of the bearing surfaces 24, 25 at all times. The end face 24 of the bearing member 17 remote from the end plate 14 provides an annular bearing surface engageable with the thrust bearing surface 25 of the thrust disc 7. Both of these bearing surfaces 24, 25 are uninterrupted, i.e., devoid of grooves or other flow-disturbing irregularities, to thus ensure the establishing of a stable hydrodynamic film between the face 24, 25.

The sleeve 10 on the shaft 3 is provided within the cylindrical bearing member 17 spaced therefrom, the space 26 so formed being of eccentric annular cross-section and this space 26 is in direct communication with the atmosphere outside the casing or stator 2 via an outlet passage-way or bore 27 provided within the end plate 14 and outlet ports 28 within the plate. The outlet passageway 27 has an enlarged portion forming an annular chamber 29, the outlet ports 28 extending radially from this chamber.

The cylindrical bearing member 17 is held with its annular bearing surface 24 in contact with the thrust bearing surface 25 of the thrust disc 7 by biasing means engaging against its outer annular end 31, such as a series of O-rings 30 made of an elastomer material and which provides the necessary flexibility to ensure continuous contact of these mating faces. The O-rings 30 are accommodated in a suitable recess 32 provided in the end plate 14 and against which they bear.

The annular bearing surface 24 engages eccentrically of the thrust bearing surface 25 of the thrust disc 7 attached to the rotor 1 and is of such internal and outer diameter as to lie within the outer diameter of the thrust disc 7.

The stator or casing 2 encircling the annular extension 15 of end plate 14 and the cylindrical bearing member 17 provides an annular space 33 encircling the cylindrical bearing member 17 as shown in FIG. 1. The space 33 is in communication with the space 13 between the rear face 4 of the rotor 1 and the bearing surface 25 of the thrust disc 7. The proportion and location of the area of surface 25 exposed to this space will vary according to the relative position of the annular eccentric bearing surface 24 of the cylindrical bearing member 17, with the thrust bearing surface 25 of the thrust disc 7.

As the shaft 3 is rotated, the rotor 1 and thrust disc 7 attached thereto are rotated therewith, the rotor acting upon the liquid or gas being treated within the housing 2, to rotate this fluid as required by the machine or pump in which it is installed. At the same time the rotation of shaft 3 will cause relative rotational movement between the thrust bearing surfaces 24, 25 whereby the thrust bearing surface 25 of the thrust disc 7 will rotate relative to the substantially stationary annular thrust bearing surface 24 of the cylindrical thrust member 17. The biasing means 30 bearing against the outer end 31 of the cylindrical thrust member 17 will hold the annular thrust bearing surface 24 in contact with the thrust bearing surface 25 of the thrust disc 7.

Due to the space 13 provided between the rear face 4 of the rotor 1 and the inner surface of the part 12 of housing 2 the liquid being treated may enter the space 33 encircling the cylindrical bearing member 17 and thus contact the surface of the thrust disc 7 exposed to this space 33, namely the portion of thrust surface 25 lying radially outwardly beyond the outer diameter of the cylindrical bearing member 17. The liquid or gas within the space 33 acts as a lubricant and is drawn into the inter-face area between faces 24, 25 continuously by normal hydro-dynamic forces. With the eccentrically operating mating thrust bearing surfaces 24, 25 a relatively large portion of the contact area of the thrust disc 7 is progressively exposed to the lubricating fluid. Thus film of lubricant fluid is induced to flow into the inter-face region of the thrust bearing surfaces 24, 25 and so prevent direct solid contact of the mating thrust bearing surfaces 24, 25. Thus it is ensured that a continually changing area of one of the mating faces of the thrust bearing surfaces is at all times exposed to the fluid being handled by the pump or machine.

In order to effect simultaneous cooling of these surfaces 24, 25 in particular when the material used in the thrust disc 7 and cylindrical bearing member 17 is of poor thermal conductivity, direct communication between the air of the atmosphere outside the machine with the surface 25 of the thrust disc 7 within the cylindrical bearing member 17 via the passageways 26, 27 encircling the sleeve 10 and bores 28 within the end plate 14 can be effected. In this way a continually changing area of the mating faces of the thrust bearing surfaces 24, 25 is at all times exposed to the air space on the outside of the pump or machine.

If desired chilled air could be fed into passageway 27 via one of the outlets 28 and removed from the other. This is of particular advantage if the liquid being handled by the machine is not allowed to come into contact with an alternative coolant such as water which could be fed into the space within the cylindrical bearing instead of air. Cooling water could be fed in through one of the ports 28 in the end plate 14 into the annular chamber 29 where it may pass through the outer passageway 27 encircling the sleeve and shaft and then come into contact with the thrust bearing surfaces 24,25 and cool and to some extent lubricate the cylindrical bearing member 17 and likewise the thrust disc 7. The water can be removed via the other outlet port 28 provided in the end plate 14. As the cooling water or liquid coolant flows back toward the end plate 14 it is preferably pushed outwardly towards the outlet port 28 by a so called "slinger" 35 encircling the sleeve 10 within the enlarged annular chamber 29 by virtue of centrifugal force. This "slinger" 35 is in the form of an annulus or ring preferably with tapered cross-section.

The sleeve 10 is preferably of suitable corrosion-resisting material such as plastics material for example, when the liquid or gas being treated is corrosive and is provided on its outer surface with a return screw-threaded 34 impressed therein so that the cooling liquid fed into the space 26 surrounding the sleeve 10 is assisted to move axially into the region adjacent the thrust bearing surfaces 24, 25.

By suitably proportioning the thrust bearing surfaces 24, 25 and by mounting the rotary thrust disc 7 and stationary cylindrical thrust member 17 eccentric to each other by a predetermined relative amount it is possible to achieve the desirable operating features, namely the provision of maximum sealing between the liquid being treated in the casing 2 of the machine or pump and the shaft 3 and adequate lubrication and cooling of the mating surfaces. It has been found that with an eccentricity of the bearing surfaces 24, 25 whereby the centres of the two bearing surfaces are out of line with each other by substantially half of the face; width of the narrower faced member, in this case the member 17, a full hydrodynamic film of lubricant may be wiped in one revolution. In the case when the arrangement is used in the form of a mechanical seal, thrust bearing surfaces 24, 25 in fact act as the sealing surfaces and the seal is provided likewise with minimum wear and also the ability to withstand short periods of adverse running conditions - such as might occur when a pump is inadvertently allowed to run dry.

Thus with the arrangement of the invention satisfactory flow of lubricating fluid is provided between the thrust or sealing faces and cooling can likewise be effected.

When the corrosive materials are being treated the thrust bearing or sealing surfaces and rotor and housing are made of non-corrosive materials, such as ceramics, plastics or suitable metals depending upon the materials being treated and other conditions.

It will be appreciated that various modifications of the specific embodiment of the invention described above are envisaged within the scope of the invention as set forth in the appended claims.

We claim:

1. Lubricating and cooling apparatus comprising means defining a first bearing surface; means defining a second bearing surface, said second bearing surface being mountd in mutual contact with and eccentrically of the first bearing surface and one of said means being mounted for rotation relative to the other of said means; the eccentricity of the bearing surfaces is such that the centres of the two bearing surfaces are out of line with each other by substantially half the face width of the narrower face member; means for enabling flow of lubricant to the first bearing surface outwardly of the mutually contacting portions of said bearing surfaces, and means for enabling flow of coolant to the first bearing surface inwardly of said mutually contacting portions, whereby during rotation of said one means relative to said other means the lubrication and cooling of the bearing surfaces can be effected.

2. Lubricating and cooling apparatus as claimed in claim 1, which includes passage means for communication with the first bearing surface inwardly of said mutually contacting portions of the bearing surfaces and an inlet means, said inlet means being in communication with said passage means and with the surrounding atmosphere, whereby air may contact said first bearing surface.

3. Lubricating and cooling apparatus as claimed in claim 1, in which the second bearing surface is provided as one end face of a hollow cylindrical bearing member and the first bearing surface is formed by one end face of a thrust disc, the thrust disc being mounted on a rotatably mounted shaft, and said cylindrical bearing member being mounted encircling and eccentrically of said shaft and defining an annular passageway therebetween for flow of coolant to the first bearing surface; and means being provided to hold the cylindrical bearing member substantially stationary relative to the thrust disc and in contact with the thrust disc during rotation of the shaft.

4. Lubricating and cooling apparatus comprising a housing defining a chamber therein; a shaft mounted for rotation within said chamber; a thrust disc mounted concentrically of said shaft; one face of said disc defining a first bearing surface; a hollow cylindrical member encircling said shaft eccentrically thereof and spaced therefrom to define a first passageway therebetwen; one end face of said cylindrical member defining a second bearing surface which is annular, said second bearing surface contacting the first bearing surface with the eccentricity of the bearing surfaces such that the centres of the two bearing surfaces are out of line with each other by substantially half the face width of the narrower face member; biasing means engaging the opposite end face of said cylindrical member to hold in contact said first and second bearing surfaces; the portion of the first bearing surface positioned inwardly of its area of mutual contact with said second bearing surface being in communication with said first passageway; the portion of the first bearing surface positioned outwardly of said area of mutual contact with said second bearing surface being exposed to said chamber; a coolant inlet in communication with said passageway; and means defining a lubricant inlet to said chamber whereby during rotation of said one bearing surface relative to the other bearing surface, the area of the first bearing surface in contact with the second bearing surface varies its position on the thrust disc surface such that both coolant and lubricant may contact the interface area of said bearing surfaces during rotation of the shaft.

5. Lubricating and cooling apparatus which comprises a housing defining a chamber therein; a shaft mounted for rotation within said chamber; exit means provided within said housing for said shaft; a rotor fixedly mounted on said shaft for rotation therewith; a thrust disc mounted concentrically of said shaft and on the rear face of said rotor; one face of said thrust disc defining a bearing surface to the rear of said rotor; a hollow cylindrical member encircling said shaft eccentrically thereof and spaced therefrom to define a first passageway therebetween; one end face of said cylindrical member defining a second bearing surface which is annular; said second bearing surface contacting the first bearing surface with the eccentricity of the bearing surfaces such that the centres of the two bearing surfaces are out of line with each other by substantially half the face width of the narrower face member; biasing means engaging the opposite end face of the cylindrical member to hold in contact said first and second bearing surfaces; the portion of the first bearing surface positioned inwardly of its area of mutual contact with said second bearing surface being in communication with said first passageway; the portion of the first bearing surface is positioned outwardly of said area of mutual contact with said second bearing surface being exposed to said chamber; a coolant inlet in communication with said passageway; means of communication between the front face of the rotor and said chamber whereby during rotation of said one bearing surface relative to the other bearing surface, the area of the first bearing surface in contact with the second bearing surface varies its position on the thrust disc surface such that both coolant and fluid contained within the housing and treated by rotation of said front face of the rotor may cool and lubricate the inter-face area of said bearing surfaces during rotation of the shaft, said bearing surfaces simultaneously providing a mechanical seal between said chamber and said exit means provided in the housing for said shaft.

6. Lubricating and cooling apparatus as claimed in claim 4 in which means are provided within the housing defining a recess within which a series of O-ring seals are housed; said O-ring seals engaging said opposite end face of the cylindrical member to hold in contact said first and second bearing surface and simultaneously prevents substantial rotational movement of the cylindrical member relative to the thrust disc.

7. Lubricating and cooling apparatus as claimed in claim 4 in which the hollow cylindrical member is provided with a stepped inner diameter in its end portion adjacent the thrust disc to define a pocket or recess in contact with the thrust disc to act as a flow area for coolant flowing to the first bearing surface.

8. Lubricating and cooling apparatus as claimed in claim 4 in which a sleeve is provided encircling and fixedly connected to the shaft and provided with a screw thread on its outer surface so formed as to tend to return from said first bearing surface coolant flowing within said first passageway.

9. Lubricating and cooling apparatus as claimed in claim 4, which includes means defining an inlet for coolant in said housing; means defining an outlet for coolant in said housing; means defining an annular passageway surrounding said shaft and communicating said inlet means and outlet means with said first passageway; slinger means encircling and fixedly mounted on said shaft to rotate therewith within said annular passageway to feed returning coolant to said outlet means.

10. A pump which comprises a housing defining a chamber therein; a shaft passing into said housing for rotation therein; a rotor fixedly mounted on said shaft for rotation therewith; fluid means provided within said housing; exit means within said housing for said fluid; said rotor having a front face and a rear face; said front face being effective to act upon the fluid within said housing to pump said fluid from said housing through said exit means; the rear face of said rotor having a thrust disc mounted thereon; said thrust disc being simultaneously mounted concentrically of said shaft; the face of said thrust disc remote from said rotor defining a first bearing surface; a hollow cylinder mounted eccentrically of said shaft and spaced therefrom to define an annular passageway therebetween; one end face of said hollow cylinder defining a second bearing surface which is annular; the eccentricity of the bearing surfaces is such that the centres of the two bearing surfaces are out of line with each other by substantially half the face width of the narrower face member; biasing means holding the second bearing surface in contact with the first bearing surface whereby said annular passageway is in contact with the portion of the face of the first disc positioned inwardly of the interface of said bearing surface; means defining a coolant inlet in said housing in communication with said annular passageway; the rear face of said rotor and said housing defining therebetween a passageway for fluid to the rear face of said housing and to said one face of the thrust disc; whereby during pumping action of said rotor a relatively large portion of the bearing surfaces are progressively exposed to coolant and to said fluid whereby the inter-face areas of the bearing surfaces are continuously cooled by coolant and lubricated by said fluid.

* * * * *